United States Patent [19]

Myers

[11] Patent Number: 4,653,800
[45] Date of Patent: * Mar. 31, 1987

[54] MOBILE CAMPING APPARATUS

[76] Inventor: Robert H. Myers, 983 Moorefield Rd., Springfield, Ohio 45502

[*] Notice: The portion of the term of this patent subsequent to Oct. 22, 2002 has been disclaimed.

[21] Appl. No.: 789,616

[22] Filed: Oct. 21, 1985

Related U.S. Application Data

[63] Continuation-in-part of Ser. No. 535,031, Sep. 23, 1983, Pat. No. 4,548,438.

[51] Int. Cl.⁴ ............................................. B60P 3/34
[52] U.S. Cl. .................................. 296/160; 296/164; 296/170; 296/176; 296/26; 135/88
[58] Field of Search ............... 296/100, 160, 164, 165, 296/169, 170, 174, 176, 161, 166, 172, 26, 162; 135/88

[56] References Cited

U.S. PATENT DOCUMENTS

| | | | |
|---|---|---|---|
| 3,019,455 | 2/1962 | Carte . | |
| 3,061,358 | 10/1962 | Lien | 296/26 |
| 3,447,830 | 6/1969 | Willison | 296/26 |
| 3,514,148 | 5/1970 | Hunter et al. | 296/170 |
| 3,659,893 | 5/1972 | Steele . | |
| 4,055,366 | 10/1977 | Lee | 296/160 |
| 4,077,662 | 3/1978 | Kauffman . | |
| 4,251,102 | 2/1981 | Lee | 296/160 |
| 4,462,631 | 7/1984 | Lange | 296/160 |
| 4,548,438 | 10/1985 | Myers | 296/160 |

FOREIGN PATENT DOCUMENTS 2086315  5/1982  United Kingdom ................ 296/160

Primary Examiner—David A. Scherbel
Assistant Examiner—Russell D. Stormer
Attorney, Agent, or Firm—Jacox & Meckstroth

[57] ABSTRACT

Mobile camping apparatus which includes a van type of automotive vehicle. The van has a body provided with a chamber therein which serves as living quarters. The roof of the body is angularly movable to a raised position. Horizontal bed structure mounted adjacent the upper portion of the body serves as a ceiling for the living quarters when the bed structure is not positioned for use. The bed structure is moved linearly with respect to the body as the roof angularly moves upwardly. The bed structure becomes positioned for use when a major portion of the bed structure is substantially at the side or front of the body at the upper portion of the body. When the bed structure is so positioned for use, the living quarters is increased in volume and has substantial head room adjacent the bed structure. Motor members, rack and pinion members, and linkage members are included in the apparatus for laterally moving the bed structure and for pivotally moving the roof.

Flexible, canvas-like wall material is attached to the roof and to the bed structure and unfolds to an enclosing condition between the roof and the bed structure as the bed structure moves linearly and as the roof pivotally moves upwardly.

21 Claims, 17 Drawing Figures

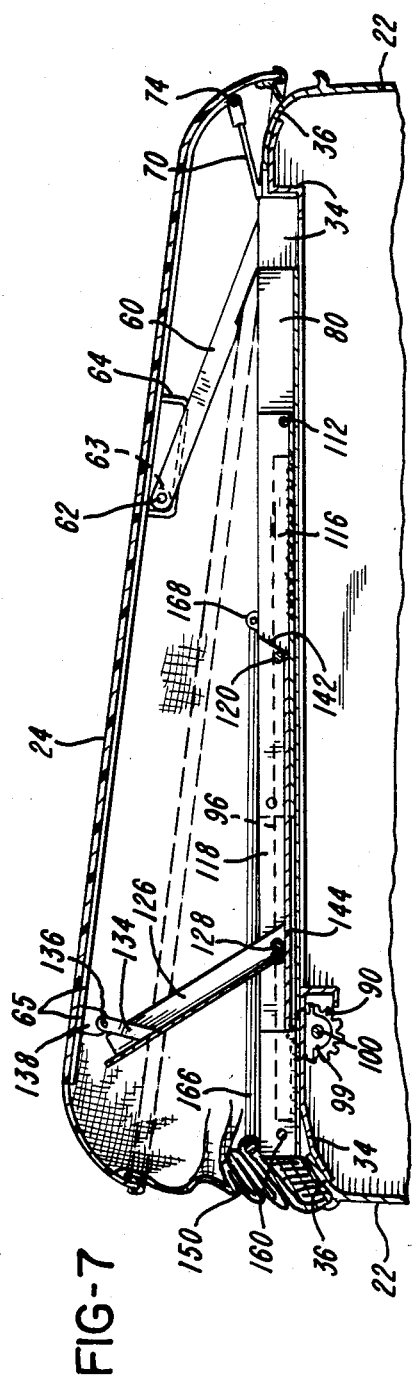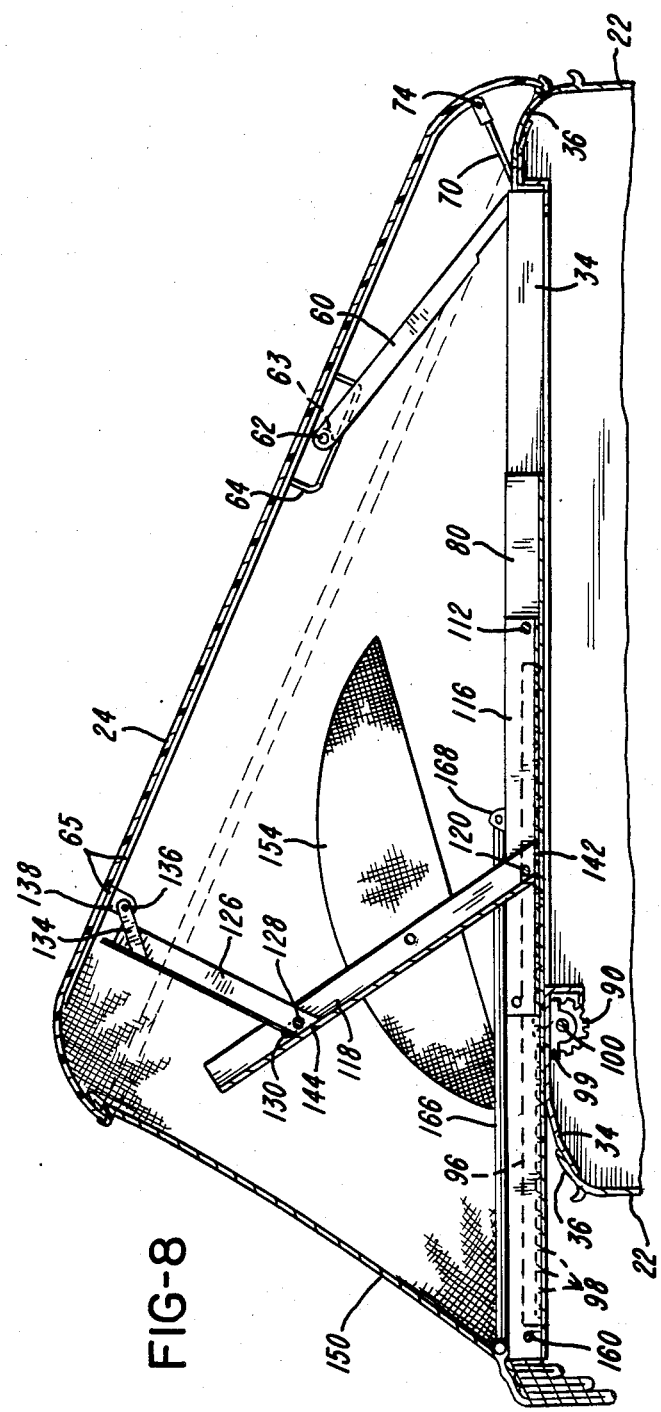
FIG-7
FIG-8

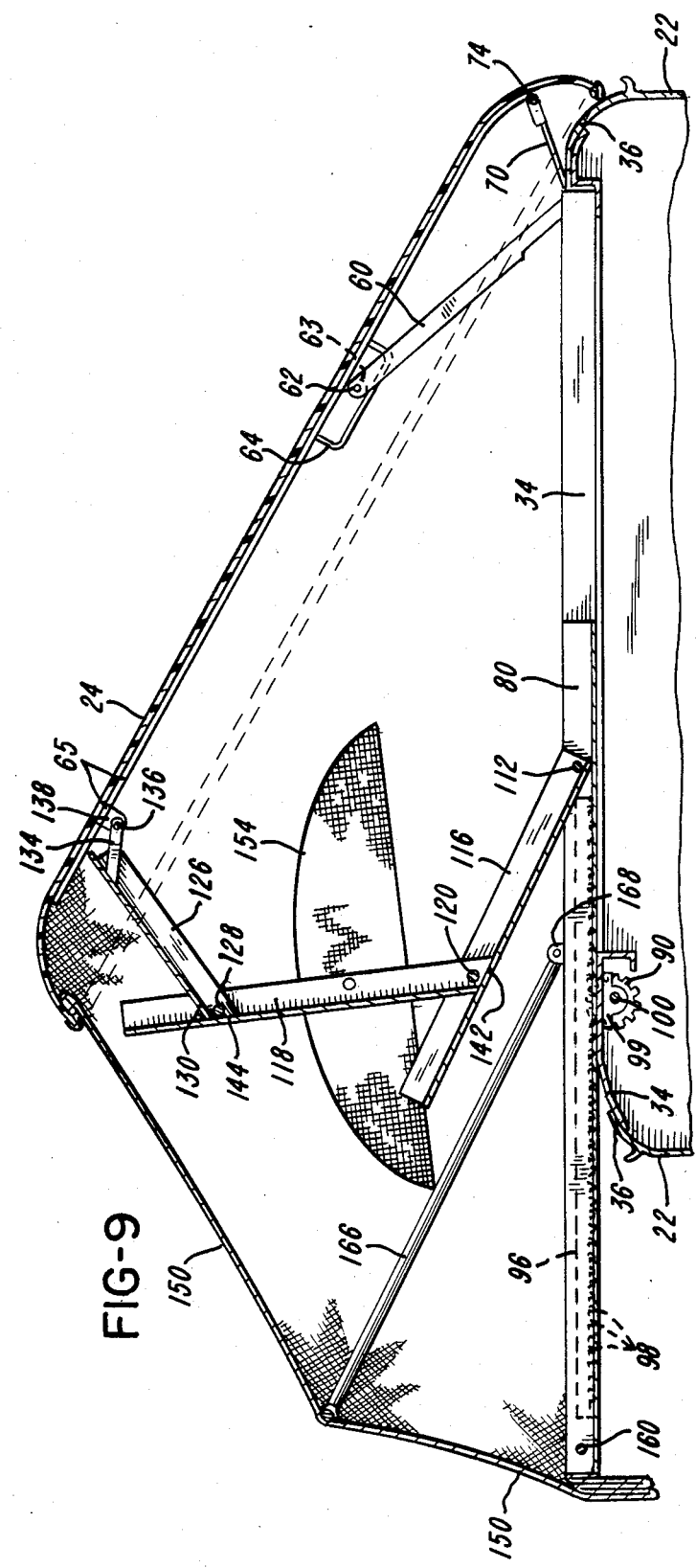

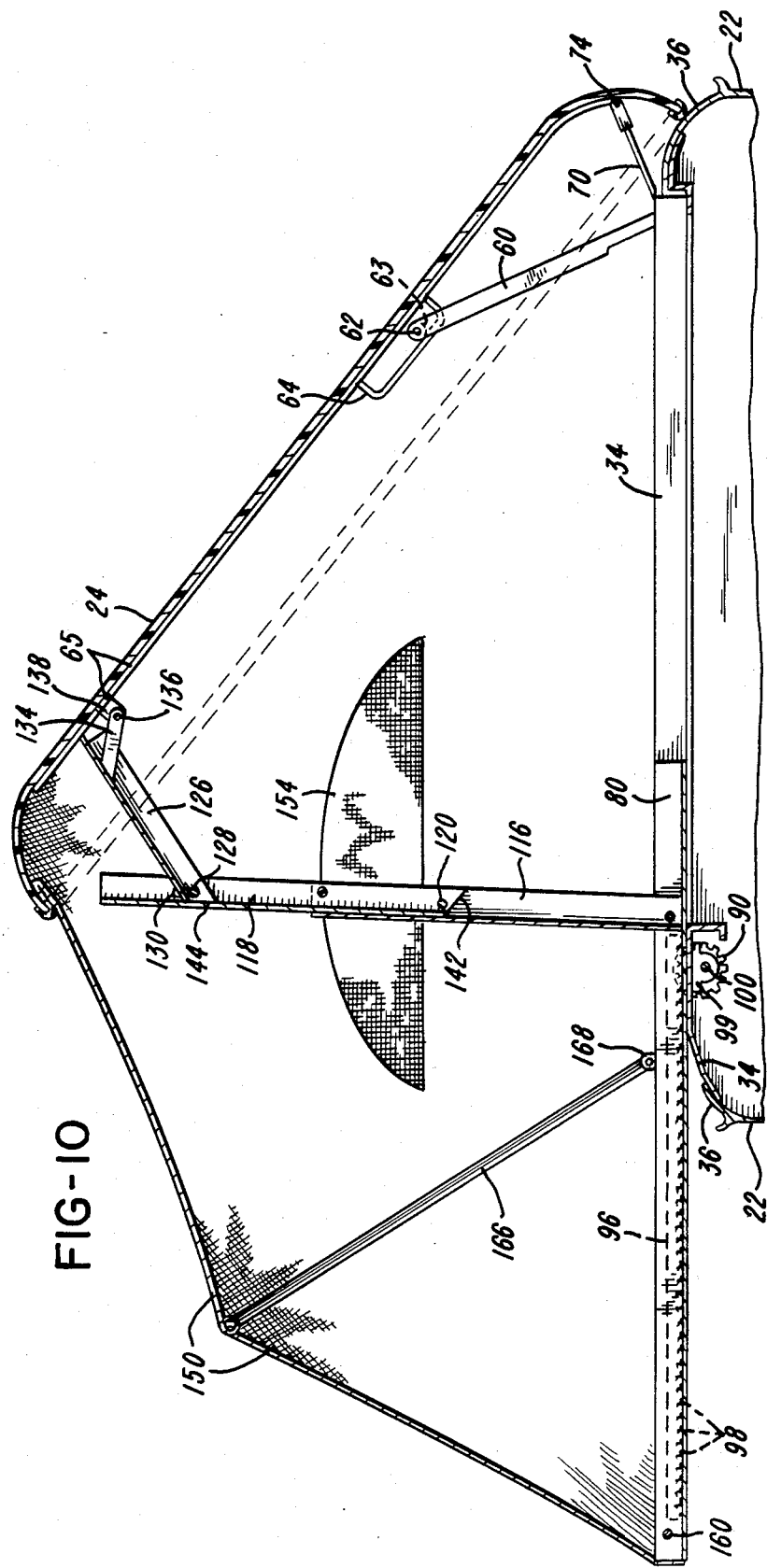

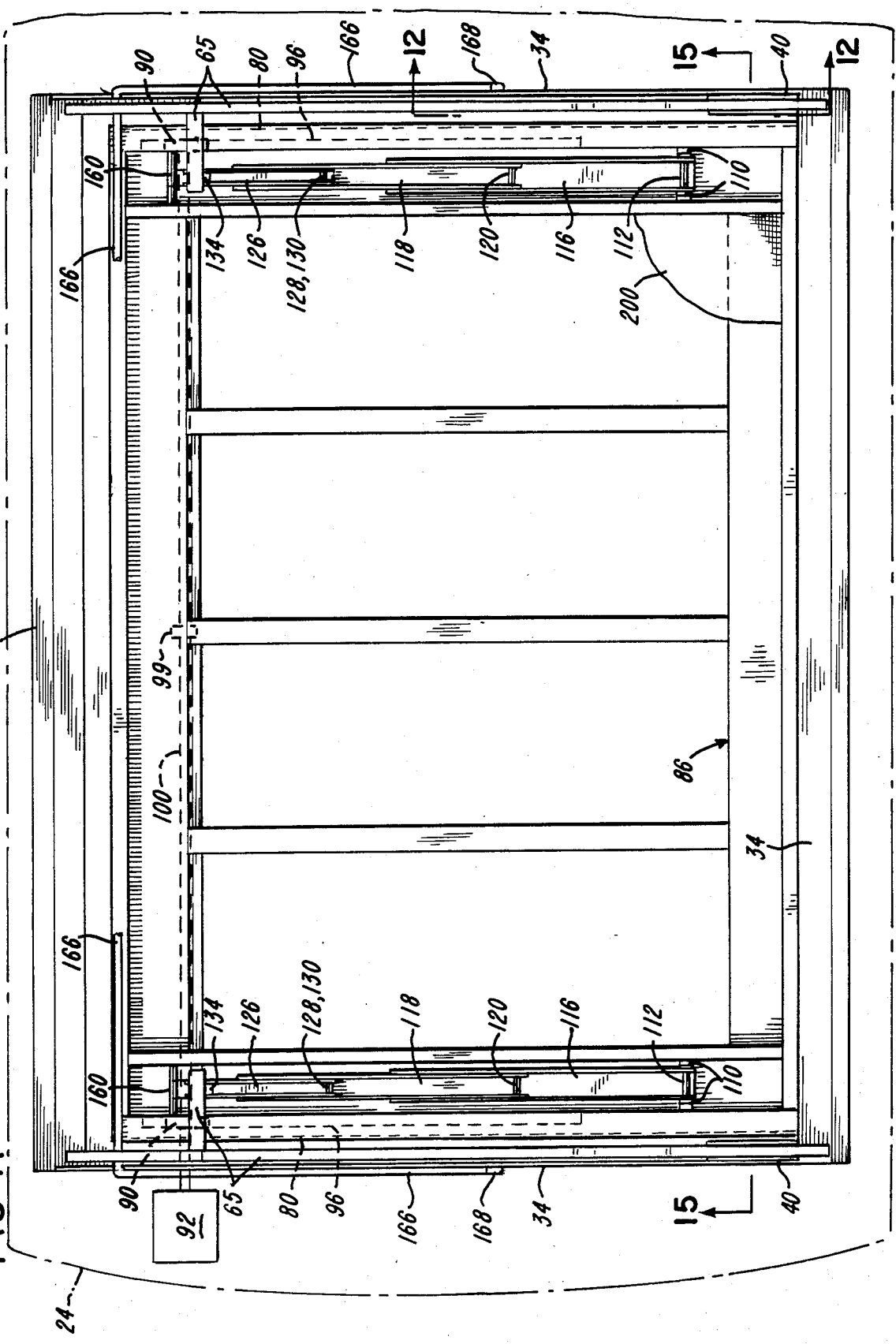

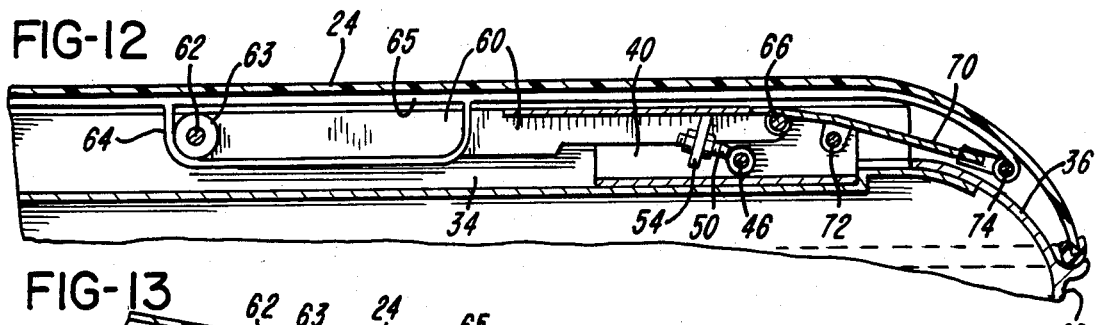
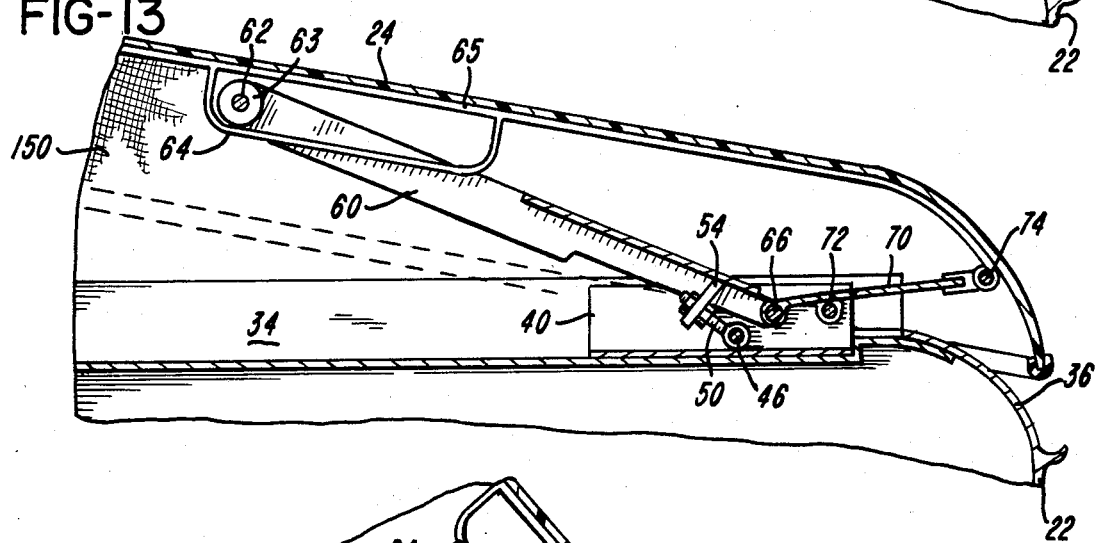
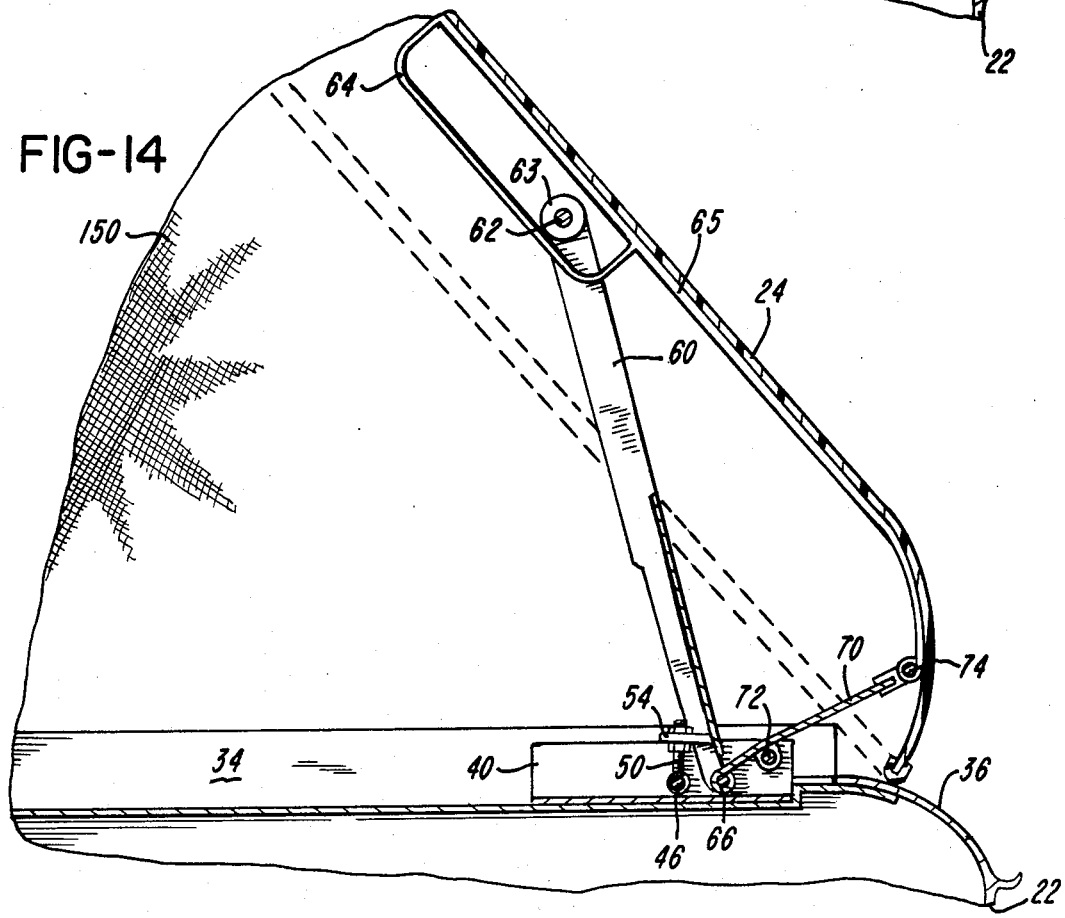

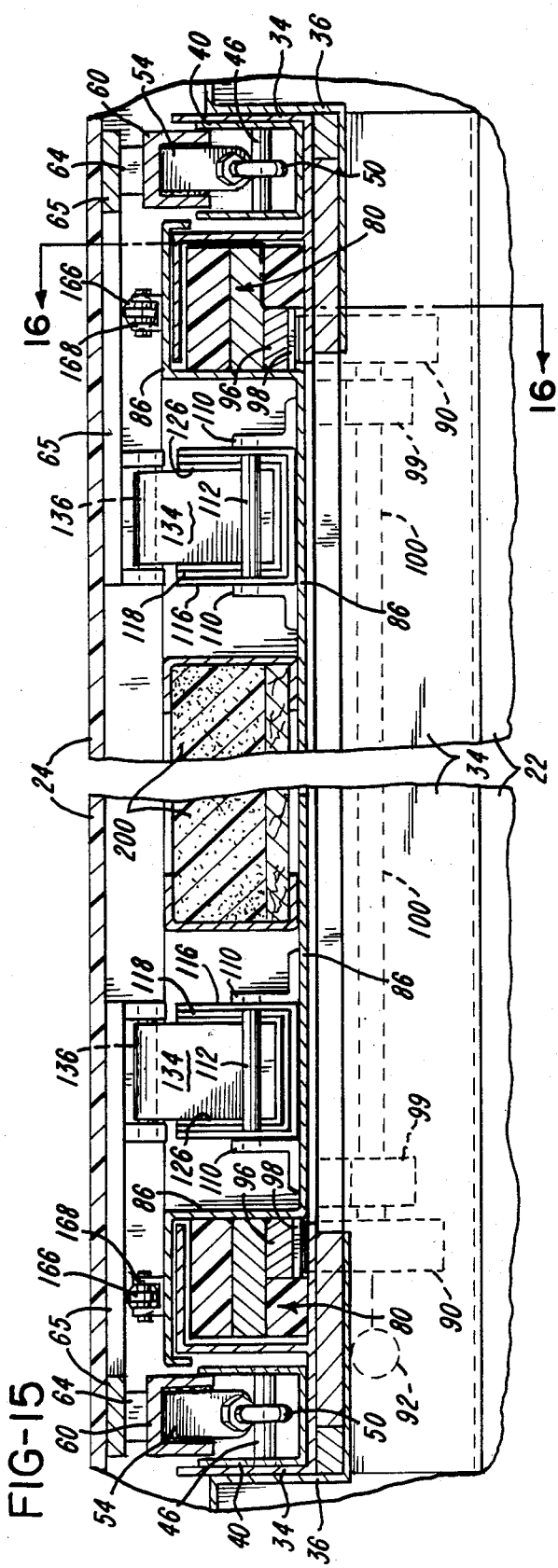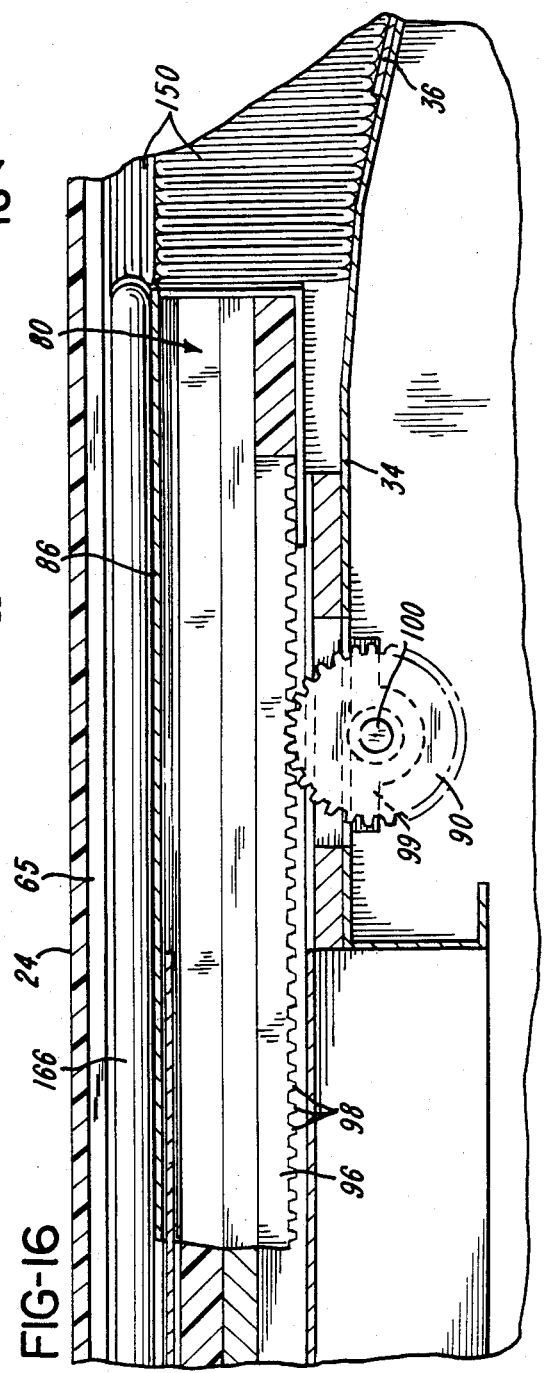

MOBILE CAMPING APPARATUS

RELATED APPLICATION

This application is a continuation-in-part of application Ser. No.535,031, filed September 23, 1983, now U.S. Pat. No. 4,548,438.

BACKGROUND OF THE INVENTION

Numerous types of van type mobile camping equipment have been created in which sleeping accommodations are available. Known van type mobile camping equipment presents various problems which the apparatus herein disclosed is constructed to solve.

One of the major problems involved in known van type mobile camping equipment is that the living quarters in the van are severely restricted when the sleeping accommodations are positioned for use.

It is an object of this invention to provide van type mobile camping apparatus which includes bed structure which is linearly movable with respect to the body of the van, so that all of the space within the van is available for use, and 'head room' is provided within the van when the bed structure is positioned for use. Thus, when the bed structure is positioned for use, the entire normal space within the van, plus additional head room, is provided.

Another object of this invention is to provide such mobile camping apparatus in which a van which is equipped with apparatus of this invention has normal dimensions when the van is arranged for travel.

It is another object of this invention to provide such mobile camping apparatus which can be readily installed in a conventional van.

Another object of this invention is to provide such mobile camping apparatus which can be mounted in a conventional van and in which the height of a conventional van is not increased when the bed structure is not arranged for use.

Other objects and advantages of this invention reside in the construction of parts, the combination thereof, the method of production and the mode of operation, as will become more apparent from the following description.

SUMMARY OF THE INVENTION

Mobile camping apparatus of this invention is of the type which includes a van style automotive vehicle provided with a body having an upper portion and side portions. The van style automotive vehicle has a roof which is angularly movable with respect to the body to a position above the body of the vehicle. As the roof is angularly moved upwardly, horizontal bed structure at the upper portion of the body is movable linearly to a position in which a portion of the bed structure extends from the body of the vehicle. Linkage means attaches the bed structure to the roof so that linear movement of the bed structure forces angular movement of the roof.

BRIEF DESCRIPTION OF THE DRAWING

FIG. 7 is a sectional view of the apparatus shown in FIG. 4, and showing another position of operation of the apparatus.

FIG. 8 is a sectional view of the apparatus shown in FIGS. 4 and 7, illustrating another position of operation of the apparatus.

FIG. 9 is a sectional view of the apparatus shown in FIGS. 4, 7, and 8, illustrating another position of operation of the apparatus.

FIG. 10 is a sectional view of the apparatus shown in FIGS. 4, 7, 8, and 9, illustrating another position of operation of the apparatus.

FIG. 11 is a sectional view taken substantially on line 11—11 of FIG. 4.

FIG. 12 is an enlarged fragmentary sectional view taken substantially on line 12—12 of FIG. 11.

FIG. 13 is a fragmentary sectional view of the apparatus shown in FIG. 12, illustrating another position of operation of the apparatus.

FIG. 14 is a fragmentary sectional view of the apparatus shown in FIGS. 12 and 13, and showing the apparatus in another position of operation.

FIG. 15 is a fragmentary enlarged sectional view, with parts broken away, taken substantially on line 15—15 of FIG. 11.

FIG. 16 is a fragmentary sectional view taken substantially on line 16—16 of FIG. 15.

DETAILED DESCRIPTION OF THE INVENTION

The mobile camping apparatus of this invention includes a vehicle in the form of a van 20. The van 20 has a body 22 and a roof 24. The roof 24 is angularly movable with respect to the body 22 by means discussed below.

Figure 3:
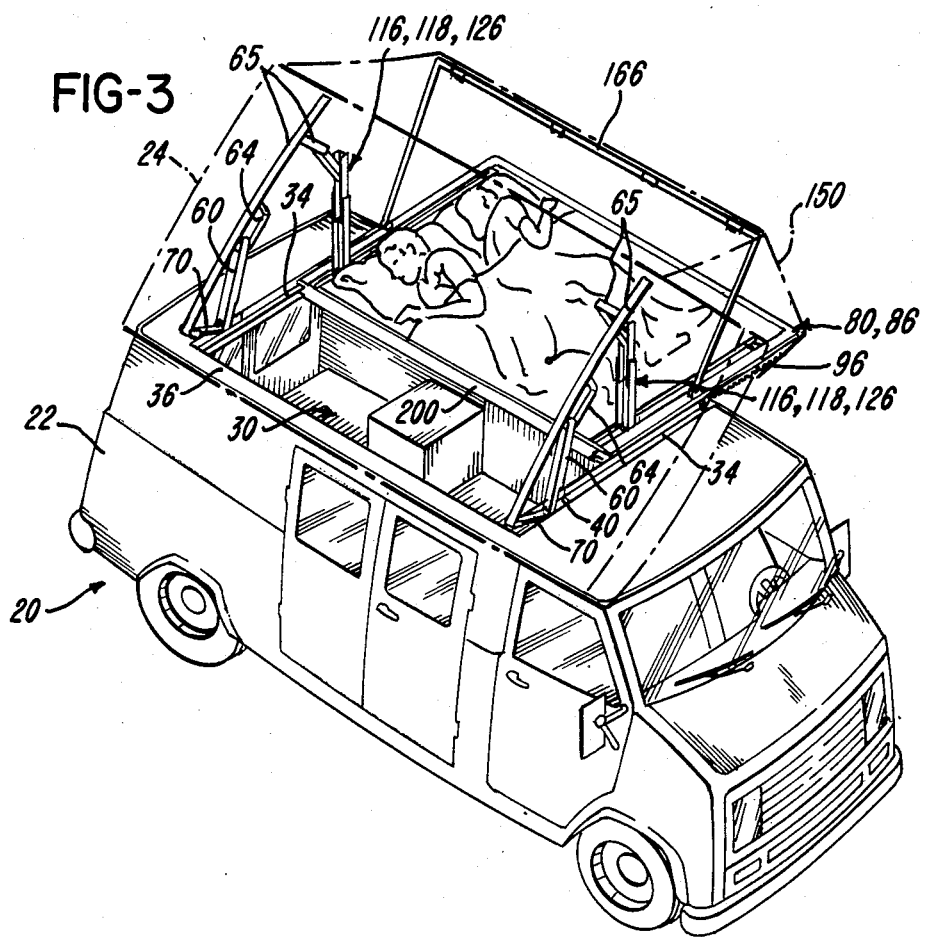
FIG. 3 is a perspective view, with parts shown in phantom, and showing the interior of the van and showing the apparatus arranged for camping use.

Within the body 22 is a chamber 30 which is adapted to serve as living quarters, as illustrated in FIG. 3.

As shown in FIGS. 3, 11, and 15, carrier support structure 34 is supported by a mounting frame 36 at the upper portion of the van body 22. Mounted upon the carrier support structure 34 are spaced-apart U-shaped channels 40. A pin 46 is attached to each channel 40. A link 50 is attached to the pin 46. As shown in FIGS. 12, 13, and 14, each link 50 is attached to a bracket 54. Each bracket 54 is secured to an arm 60. The arm 60 has a rod 62 and knob 63 at one end thereof. The rod 62 and knob 63 are movable within a retainer bracket 64. The retainer bracket 64 is attached to a connector 65 which is attached to the roof 24. The other end of the arm 60 is pivotally attached by means of a pin 66 to another arm 70. The arm 70 is pivotally attached, intermediate the ends thereof, to the channel 40, by means of a pin 72, as shown in FIGS. 12, 13, and 14. The arm 70 also has an end pivotally attached to the connector 65 by means of a pin 74 adjacent an edge portion of the roof 24, as shown in FIGS. 12, 13, and 14.

Supported upon the carrier support structure 34 is a carrier unit 80, which is movable along the carrier support structure 34. Attached to the carrier units 80 and extending therebetween is a carriage 86.

Supported by the body 22 are pinion gear members 90 which are supported by a shaft 100 which is journalled in bearing blocks 99. A rotary motor 92 is operably joined to the shaft 100 for rotation thereof. The pinion gear members 90 are in mesh with elongate toothed racks 96 having teeth 98. The toothed racks 96 are attached to the carrier units 80. The shaft 100 extends from the rear portion of the body 22 to the front portion of the body 22.

Attached to the carriage 86 adjacent the support units 80 is a pair of spaced-apart pedestals 110. A pin 112 is attached to each pair of pedestals 110 and extends therebetween.

A channel-shape arm section 116 is pivotally attached to the pin 112. A channel-shape arm section 118 is pivotally attached to the arm section 116 intermediate the ends of the arm section 116. A pin 120 attaches the arm section 118 to the arm section 116.

An arm section 126 is pivotally attached to the arm section 118 by means of a pin 128 which is attached to the arm section 126. The arm section 118 has an elongate slot 130 therein, through which the pin 128 extends. A link 134 is rigidly secured to the arm section 126 and extends angularly therefrom. A pin 136 pivotally attaches the link 134 to a bracket 138 which is attached to the connector 65 which is secured to the roof 24 on the underside thereof.

The arm section 118 has an angular end surface 142. The arm section 126 has an angular end surface 144.

A flexible cover member 150 is attached to the roof 24 and is also attached to the carrier units 80. The flexible cover member 150 is provided with a window 154, as shown in FIGS. 2, 8, 9 and 10. Each of the carrier units 80 has attached thereto a horizontal abutment pin 160, which is adjacent the attachment of the flexible cover member 150 to the carrier units 80.

An elongate brace 166 is pivotally attached to each of the carrier units 80 by means of a bracket 168 and is also attached to the flexible cover member 150.

Between the two pairs of pedestals 110 the carriage 86 supports a bed structure 200.

FIGS. 3, 11, and 15 show that sets of arm sections 116, 118, and 126, and sets of arms 60 and 70 are at opposite portions of the apparatus.

OPERATION

Figure 1:
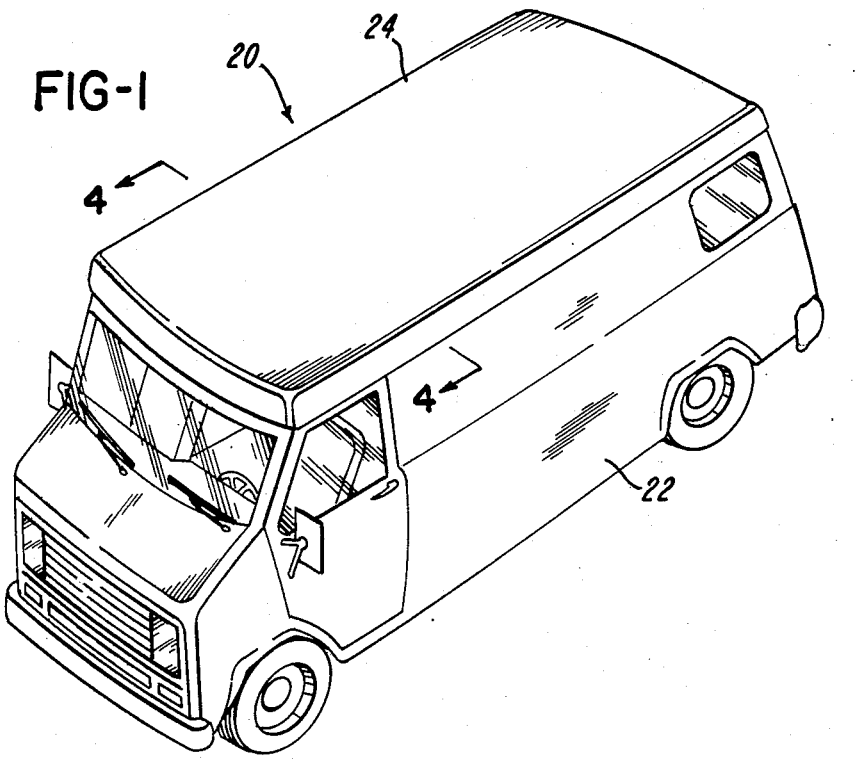
FIG. 1 is a perspective view of mobile camping apparatus of this invention in association with a van and in which the apparatus is arranged to permit normal usage of the van.

FIG. 1 shows the mobile camping apparatus of this invention arranged for normal travel conditions. In the condition for travel, the bed structure 200 and the carriage 86 form a ceiling over the chamber or living quarters 30.

Figure 4:
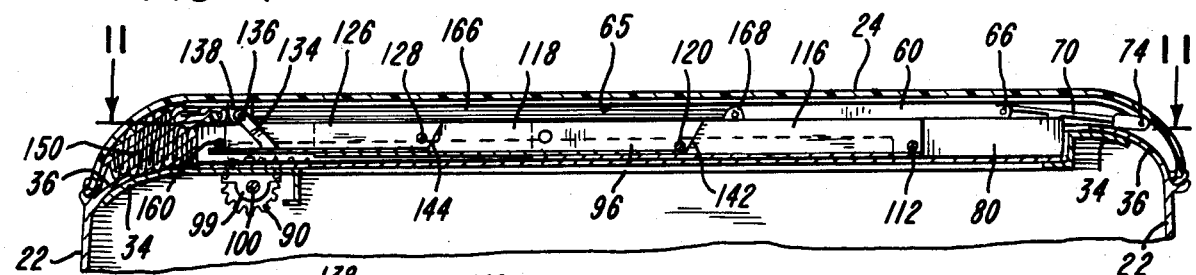
FIG. 4 is an enlarged fragmentary sectional view taken substantially on line 4—4 of FIG. 1.
Figure 5:
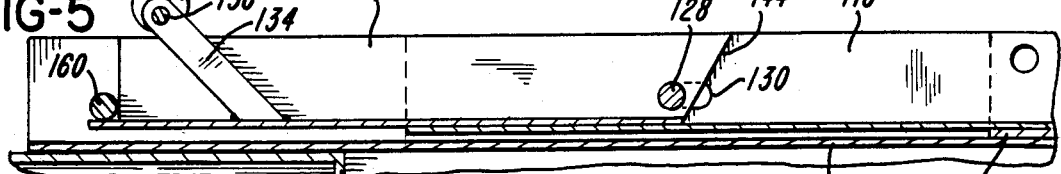
FIG. 5 is an enlarged fragmentary sectional view showing a portion of the apparatus of FIG. 4.

When the mobile camping apparatus is arranged for normal travel, as shown in FIG. 1, the roof 24 is in its down position upon the body 22, as illustrated in FIGS. 4, 12, 15, and 16. In this position, the carriage 86 and the bed structure 200 are positioned at the maximum positions thereof toward the right side of the body 22, as illustrated in FIGS. 4 and 5. In the positions shown in FIGS. 4 and 5, the horizontal abutment pin 160, which is attached to the carrier units 80, is positioned immediately above the end of the arm section 126. The arm sections 126, 118, and 116 are in horizontal alignment, as shown in FIG. 5. Due to the fact that the horizontal abutment pin 160 is immediately above the end of the arm section 126, as shown in FIGS. 4 and 5, the arm section 126 cannot move upwardly. Thus, the roof 24 is secured in its down position until the carriage 86 begins to move.

Figure 2:
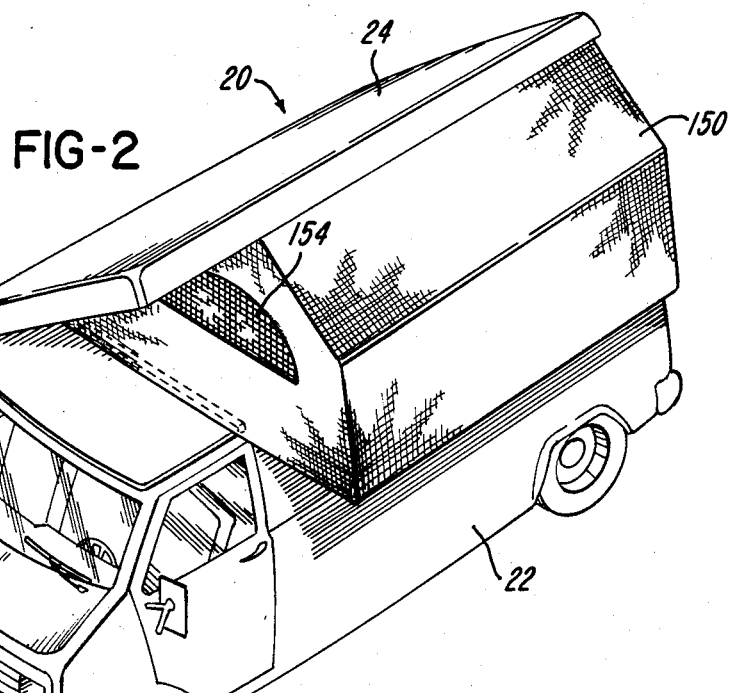
FIG. 2 is a perspective view of the mobile camping apparatus of FIG. 1 showing the apparatus arranged for camping use.
Figure 6:
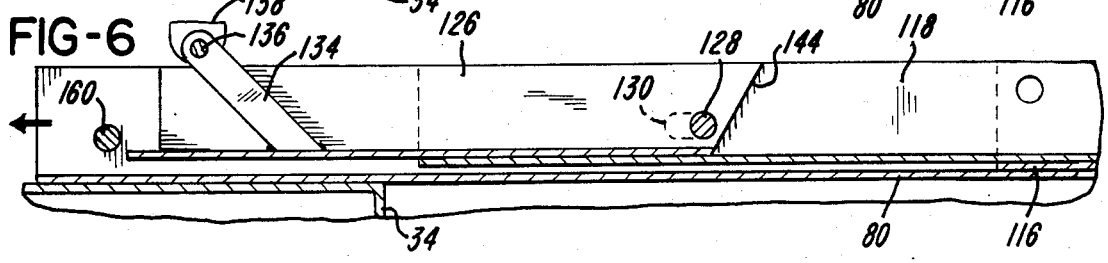
FIG. 6 is a fragmentary sectional view, drawn on substantially the same scale as FIG. 5, and illustrating parts of the apparatus in another position of operation.

FIGS. 2 and 3 show the mobile camping apparatus of this invention in condition for camping use. When the mobile camping apparatus is arranged in the manner shown in FIG. 1 and it is desired to change to the conditions shown in FIGS. 2 and 3, the motor 92 is energized, and the motor 92 rotates the shaft 100, and the pinion gear members 90. The pinion gear members 90 are in mesh with the toothed racks 96. The toothed racks 96 are attached to the carrier units 80. Therefore, rotation of the pinion gear members 90 causes linear movement of the carrier units 80. As the motor 92 initially rotates the pinion gear members 90, the carrier units 80 and the carriage 86 move slightly to the left, as shown in FIG. 6. Thus, the horizontal abutment pins 160 are moved slightly to the left, as illustrated in FIG. 6. Thus, movement of the carrier units 80 and the pins 160 to the left, releases the arm sections 126 for upward movement, and thus the roof 24 is movable upwardly.

As the motor 92 continues to operate and the pinion gear members 90 continue to rotate and the toothed racks 96 continue to linearly move, the carrier units 80 are linearly moved toward the left of the body 22, as shown in FIGS. 7, 8, 9, and 10. Thus, the arm sections 126, 118, and 116 are moved toward the left.

Due to the fact that each arm section 126 is attached to the roof 24, movement of the arm sections 116, 118, and 126 toward the left forces the roof 24 to begin to pivotally move upwardly, as illustrated in FIG. 7.

As the arm sections 126, 118, and 116 move toward the left with movement of the carrier units 80, each arm section 126 is pivotally moved upwardly with pivotal upward movement of the roof 24. The arm sections 126 continue to pivotally move with respect to the arm sections 118 until the angular end surface 144 of each arm section 126 engages the horizontal surface of its respective arm section 118, as illustrated in FIG. 7.

Then further movement of the carrier units 80 to the left forces the roof 24 farther upwardly, and the arm sections 118 pivotally move with respect to the arm sections 116, as illustrated in FIG. 8. As the carrier units 80 and the arm sections 118 and 116 continue to move to the left, the arm sections 118 continue to pivotally move with respect to the arm sections 116 until the angular end surface 142 of the arm sections 118 engages the horizontal surface of the arm sections 116, as illustrated in FIG. 8.

Then continued travel of the carrier units 80 to the left forces the arm sections 116 to pivotally move with respect to the carrier units 80, and the roof 24 is pivotally moved upwardly to a greater degree, as illustrated in FIG. 9. As the carrier units 80 continue to travel to the left, the arm sections 116 pivotally move with respect to the arm sections 118 until the arm sections 116 are in axial alignment with the arm sections 118, as illustrated in FIG. 10. Thus, the roof 24 is pivotally moved to its maximum degree.

As the roof 24 is moved upwardly with movement of the carrier units 80 to the left, the carriage 86 and the bed structure 200 are moved to the left and extend from the side of the body 22, as best illustrated in FIGS. 2 and 3.

As the roof 24 is pivotally moved in the manner discussed above, and as the carrier units 80 move to the left, the brace members 166 are moved to the left by the carrier units 80 and pivotally move upwardly and force portions of the flexible cover member 150 upwardly, as illustrated in FIGS. 9 and 10. Thus, the flexible cover member 150 is forced to extend outwardly between the roof 24 and the carriage 86, as illustrated in FIG. 10.

As the carrier units 80 and the carriage 86 are moved to the left and as the roof 24 pivotally moves upwardly, the links 50, the arms 60, and the arms 70 are pivotally moved upwardly, as illustrated in FIGS. 13 and 14. As the roof 24 angularly moves and as the arm 60 pivotally moves, the rod 62 and knob 63 move transversely within the retainer bracket 64. Pivotal movement of the arms 60 and 70 forces the right hand edge of the roof 24 to move upwardly and to the left, as illustrated in FIG. 13. As the roof 24 is moved to its maximum upper position, as shown in FIG. 14, the right hand edge of the roof 24 is moved into engagement with the upper right hand portion of the body 22, as shown in FIG. 14. Thus, the roof 24 seals against the body 22 in the maximum upper position of the roof 24.

The hinge mechanisms comprising the arms 60 and 70 and the link 50 provide means by which the apparatus of this invention is adapted for use with vans of various sizes and shapes and dimensions, due to the fact that the edge of the roof 24 rises and re-seats as the roof 24 angularly moves.

Thus, when the carriage 86 and the bed structure 200 are positioned as illustrated in FIGS. 2 and 3, the chamber 30 has head room in which a person may stand in the region to the right of the bed structure 200, as shown in FIG. 3.

FIG. 17

Figure 17:
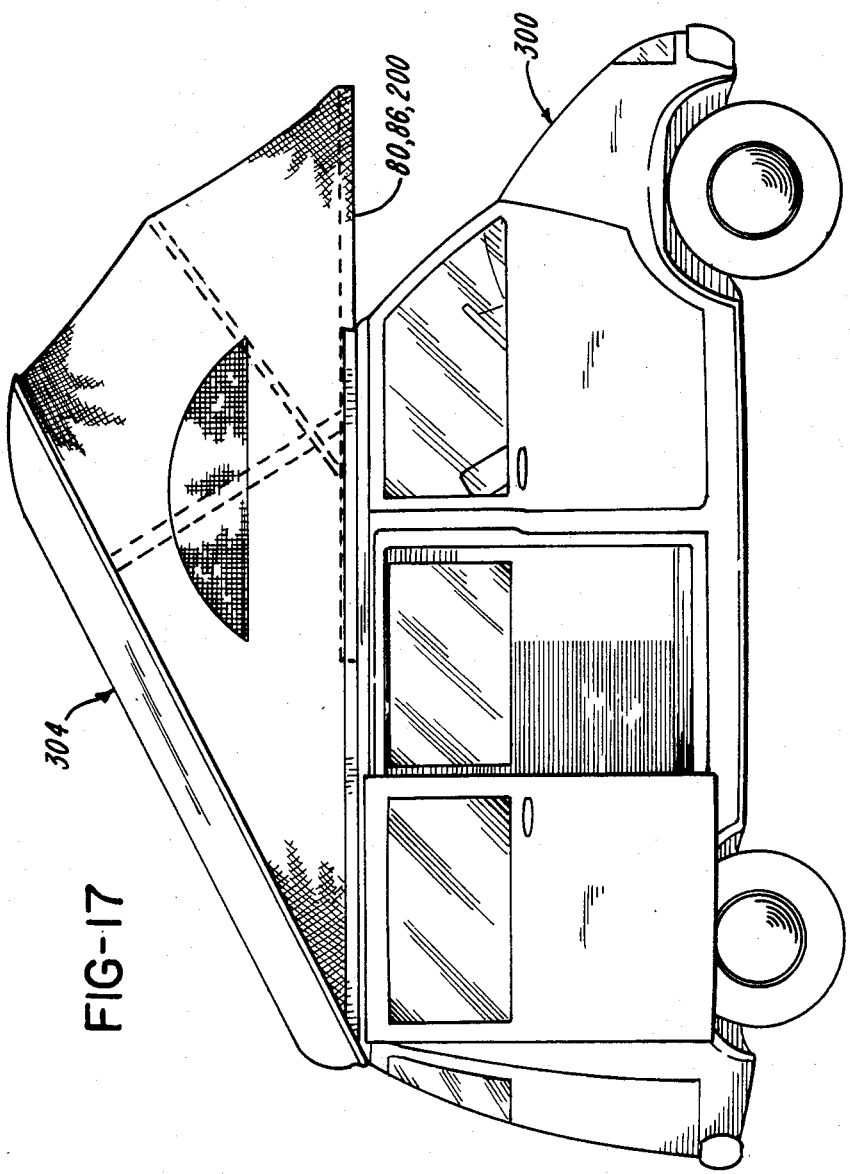
FIG. 17 is a side elevational view drawn substantially on the same scale as FIGS. 1-3, and showing a modification in the mobile camping apparatus of this invention.

FIG. 17 shows a van 300 having a roof 304. This view shows another embodiment of this invention In this embodiment the apparatus is positioned ninety degrees with respect to the apparatus shown in the other figures. The van has a roof 304. In the embodiment shown in FIG. 17, the carrier units 80 and the carriage 86 and bed structure 200 move toward the front of the van 300 as the roof 304 is pivoted about the rear part of the van 300. Thus, the front part of the roof 304 is moved upwardly with pivotal movement by the roof. Substantially the same operation of elements occurs in this embodiment as occurs in the embodiment of the other figures.

Although the preferred embodiments of the mobile camping apparatus of this invention have been described, it will be understood that within the purview of this invention various changes may be made in the form, details, proportion and arrangement of parts, the combination thereof, and the mode of operation, which generally stated consist in a apparatus within the scope of the appended claims.

The invention having thus been described, the following is claimed:

1. Mobile camping apparatus of the type which includes a van style of automotive vehicle provided with a body having an upper portion, the improvement comprising a roof carried by the upper portion of the body, the roof having edge portions, means hingedly attaching an edge portion of the roof to the body, the roof being movable between a horizontal position above the body and an angular position above the body, stationary horizontal support members attached to the body adjacent the upper portion thereof, horizontal carriage structure supported by the support members and movable linearly upon the stationary support members to a position in which at least a portion of the carriage structure extends from the stationary horizontal support members as the roof is at an angular position above the body, motor means, and means operably connecting the motor means to the carriage structure for moving the carriage structure upon the stationary horizontal support members, and means connecting the carriage structure to the roof for angularly moving the roof with linear movement of the carriage structure.

2. The mobile camping apparatus of claim 1 which includes a toothed rack, means attaching the carriage structure to the toothed rack, a rotatable toothed gear member rotatably supported by the body and in mesh with the toothed rack, means connecting the toothed gear member to the motor means for moving the carriage structure with respect to the body as the toothed gear member rotatably operates.

3. The mobile camping apparatus of claim 2 which includes bed structure, carrier means supported by the toothed rack, the carriage structure being supported by the carrier means, the carriage means supporting the bed structure, pivotal arm means, means pivotally attaching the arm means to the roof, and means pivotally attaching the arm means to the carrier means, whereby movement of the carrier means with movement of the toothed rack forces movement of the pivotal arm means and the pivotal arm means forces angular movement of the roof.

4. The mobile camping apparatus of claim 1 which includes a first arm, means pivotally connecting the first arm to the upper portion of the body, means pivotally attaching the first arm to an edge portion of the roof, a second arm, means pivotally joining the second arm to the first arm, means pivotally connecting the second arm to the roof, whereby the edge portion of the roof moves upwardly from the body as the roof angularly moves with respect to the body.

5. The mobile camping apparatus of claim 1 which includes a toothed rack, rotatable gear means in mesh relation to the toothed rack, means attaching the toothed rack to the carriage structure, bed structure supported by the carriage structure, arm means, means pivotally attaching the arm means to the roof, the arm means comprising a plurality of arm sections pivotally attached together and pivotally movable for angular movement of the roof as the carriage structure travels with travel of the toothed rack, and means pivotally attaching the arm means to the carriage structure, whereby rotation of the gear means forces linear movement of the toothed rack and the carriage structure, and movement of the carriage structure forces movement of the arm means, and the arm means forces angular movement of the roof, the arm sections being relatively movable to axially aligned positions, the arm sections being relatively movable to angular positions as the arm sections force angular movement of the roof.

6. The mobile camping apparatus of claim 1 in which the body has upper opposed side portions and the stationary horizontal support members are carried by the upper side portions.

7. The mobile camping apparatus of claim 1 in which the means connecting the carriage structure to the roof comprises linkage means, means joining the linkage means to the carriage structure and to the roof whereby the roof is forced by the linkage means to angularly move as the carriage structure moves linearly.

8. Mobile camping apparatus of the van type in which the van is provided with a body having an upper portion covered by a roof, in which the roof is angularly movable with respect to the body comprising: stationary support structure attached to the upper portion of the body, linearly movable support structure supported by the stationary support structure, linkage means pivotally attached to the movable support structure and to the roof for angular movement of the roof with linear movement of the movable support structure, an elongate toothed rack attached to the movable support structure, rotatable gear means in mesh relationship with the toothed rack and rotatable to move the toothed rack and the movable support structure.

9. The mobile camping apparatus of claim 8 in which the linkage means includes a plurality of arm sections arranged in substantially coplanar relationship and pivotally attached together intermediate the ends thereof, there being a first arm section, means pivotally attaching the first arm section to the movable support structure, means pivotally connecting another of the arm sections to the roof, whereby the arm sections force angular movement of the roof as the movable support structure moves with respect to the stationary support structure.

10. The mobile camping apparatus of claim 8 in which the linkage means includes a plurality of channel sections which are pivotally attached together in substantially coplanar relationship, there being a first channel section, means pivotally connecting the first channel section to the roof, there being a second channel section, means pivotally connecting an end of the first channel section to a juncture portion of the second channel section which is intermediate the ends of the second channel section, there being a third channel section, means connecting an end of the second channel section to a juncture portion of the third channel section which is intermediate the ends of the third channel section, the first channel section having an angular end part which is engageable with the juncture portion of the second channel section, the second channel section having an angular end part which is engageable with the juncture portion of the third channel section, means pivotally attaching an end portion of the third channel section to the movable support structure, whereby the channel sections move angularly and force angular movement of the roof with linear movement of the movable support structure.

11. The mobile camping apparatus of claim 8 in which the roof has an edge portion, a first arm, the first arm being pivotally attached to the edge portion of the roof, means pivotally attaching an intermediate portion of the first arm to the upper portion of the body, a second arm, bracket means loosely pivotally attaching an end part of the second arm to the roof at a portion of the roof spaced from the edge portion thereof to permit the end portion of the second arm to move along the roof, means pivotally connecting the first arm to the second arm, means pivotally connecting the second arm to the upper portion of the body, whereby angular movement of the roof forces the edge portion of the roof to move with respect to the upper portion of the body.

12. Mobile camping apparatus of the type which includes a van type of automotive vehicle provided with a body having an upper portion, the improvement comprising a roof movable between a horizontal position upon the upper portion of the body and an angular position above the upper portion of the body, a pair of spaced-apart stationary support members attached to the body at the upper portion of the body, horizontal carriage structure supported upon the stationary support members, the carriage structure being movable horizontally upon the stationary support members from a position directly above the upper portion of the body to a position in which at least a part of the carriage structure extends beyond the upper portion of the body, a pair of arm units, means pivotally attaching the arm units to opposite portions of the carriage structure, means pivotally attaching the arm units to the roof, toothed rack and pinion gear means attached to the carriage structure and to the upper portion of the body and operable to move the carriage structure upon the stationary support structure, whereby the arm units force angular movement of the roof as the carriage structure moves with respect to the stationary support structure.

13. The mobile camping apparatus of claim 12 in which the roof has an edge portion and which includes hinge means, means pivotally attaching the hinge means to the edge portion of the roof and to another portion of the roof, and means pivotally attaching the hinge means to the upper portion of the body, whereby the hinge means forces the edge portion of the roof to move upwardly as the roof angularly moves upwardly.

14. The mobile camping apparatus of claim 12 in which the carriage structure has a travel position, the apparatus including abutment means carried by the carriage structure and engageable by a portion of the arm units to prevent pivotal movement of the arm units when the carriage structure is at its travel position, the carriage structure being movable from its travel position to a position in which the abutment means are free from engagement by the arm units to permit pivotal movement of the arm units.

15. Mobile camping apparatus of the type which includes a van type of automotive vehicle provided with a body having an upper front portion and an upper rear portion and upper side portions, the improvement comprising a roof, hinge means pivotally attaching the roof to an upper side portion of the body, a transverse stationary horizontal support member attached to the body adjacent the upper front portion and a transverse stationary horizontal support member attached to the body adjacent the upper rear portion, horizontal carriage structure supported upon the support members, the carriage structure having a forward portion adjacent the upper front portion of the body and a rear portion adjacent the upper rear portion of the body, the carriage structure being movable horizontally upon the support members from a position between the upper side portions of the body to a position in which at least a part of the forward portion and a part of the rear portion of the carriage structure are positioned laterally beyond an upper side portion of the body, a pair of arm units, means pivotally connecting the arm units to the carriage structure, means pivotally connecting the arm units to the roof, motor means, drive means joining the motor means to the carriage structure for movement of the carriage structure upon the support members, whereby operation of the motor means moves the carriage structure, and movement of the carriage structure forces the arm units to pivotally move the roof with respect to the body.

16. The mobile camping apparatus of claim 15 in which the drive means includes a toothed rack, means attaching the toothed rack to the carriage structure, a toothed pinion gear in mesh with the toothed rack, means for attaching the toothed pinion gear to the body for support thereby, and means joining the motor means to the pinion gear for rotation of the pinion gear and for movement of the toothed rack and the carriage structure.

17. The mobile camping apparatus of claim 15 in which the hinge means includes linkage means, means pivotally connecting the linkage means to the roof and means pivotally connecting the hinge means to the front portion and to the upper rear portion of the body.

18. Mobile camping apparatus of the type which includes a van style of automotive vehicle provided with a body having an upper portion, the improvement comprising a roof carried by the upper portion of the body, the roof having edge portions, means hingedly attaching an edge portion of the roof to the body, the roof being movable between a horizontal position above the body and an angular position above the body, stationary horizontal support members attached to the body adjacent the upper portion thereof, horizontal carriage structure supported by the support members and movable linearly upon the stationary support members to a position in which at least a portion of the carriage structure extends from the stationary horizontal support member as the roof is at an angular position above the body, motor means, means operably connecting the motor means to the carriage structure for moving the carriage structure upon the stationary horizontal support members, and means connecting the carriage structure to the roof for angularly moving the roof with linear movement of the carriage structure, the means hingedly attaching an edge portion of the roof to the body including a link pivotally attaching to the body, a first arm and a second arm, the first arm being pivotally attached to the edge portion of the roof, the first arm also being pivotally attached to the body, the second arm being pivotally attached to another portion of the roof, the first arm and the second arm being pivotally attached together, means securing the link to the second arm, whereby the edge portion of the roof is raised as the roof is angularly moved with respect to the body.

19. Mobile camping apparatus of the type which includes a van style of automotive vehicle provided with a body having an upper portion, the improvement comprising a roof carried by the upper portion of the body, the roof having edge portions, means hingedly attaching an edge portion of the roof to the body, the roof being movable between a horizontal position above the body and an angular position above the body, stationary horizontal support members attached to the body adjacent the upper portion thereof, horizontal carriage structure supported by the support members and movable linealry upon the stationary support members to a position in which at least a portion of the carriage structure extends from the stationary horizontal support members as the roof is at an angular position above the body, motor means, means operably connecting the motor means to the carriage structure for moving the carriage structure upon the stationary horizontal support members, and means connecting the carriage structure to the roof for angularly moving the roof with linear movement of the carriage structure, the means hingedly attaching an edge portion of the roof to the body including a first arm, means pivotally connecting the first arm to the upper portion of the body, means pivotally attaching the first arm to the edge portion of the roof, a second arm, means pivotally joining the second arm to the first arm, means pivotally connecting the second arm to the body, and means slidingly and pivotally connecting the secong arm to the roof, whereby the edge portion of the roof moves upwardly from the body as the roof angularly moves with respect to the body.

20. The mobile camping apparatus of claim 8 in which the roof has an edge portion, a first arm, the first arm being pivotally attached to the edge portion of the roof, the first arm having an intermediate portion, means pivotally attaching the intermediate portion of the first arm to the upper portion of the body, a second arm, the second arm having an end part, means pivotally attaching the end part of the second arm to the roof at a portion of the roof spaced from the edge portion thereof, means pivotally connecting the first arm to the second arm, means pivotally connecting the second arm to the upper portion of the body, whereby angular movement of the roof forces the edge portion of the roof to move with respect to the upper portion of the body.

21. The mobile camping apparatus of claim 20 in which the means for pivotally attaching the end part of the second arm to the roof, includes an elongate bracket attached to the roof, slide means carried by the end part of the second arm and slidably movable along the elongate bracket.

* * * * *